United States Patent [19]

Proske

[11] 4,208,115

[45] Jun. 17, 1980

[54] VIEWFINDER SYSTEM WITH FOCUSING SCREEN

[75] Inventor: Joachim Proske, Mascherode, Fed. Rep. of Germany

[73] Assignee: Rollei-Werke Franke & Heidecke, Braunschweig, Fed. Rep. of Germany

[21] Appl. No.: 13,643

[22] Filed: Feb. 21, 1979

Related U.S. Application Data

[63] Continuation of Ser. No. 736,705, Oct. 29, 1976, abandoned.

[30] Foreign Application Priority Data

Nov. 3, 1975 [DE] Fed. Rep. of Germany ....... 2549148

[51] Int. Cl.² ............................................. G03B 13/24
[52] U.S. Cl. ..................................... 354/201; 350/117; 354/155; 354/219
[58] Field of Search ............... 354/155, 152, 219, 289, 354/224, 225, 199–201, 227; 350/117, 9, 211, 122

[56] References Cited

U.S. PATENT DOCUMENTS

| | | | |
|---|---|---|---|
| 3,149,547 | 9/1964 | Jurenz | 354/155 X |
| 3,633,482 | 1/1972 | Tsuda | 354/199 |
| 3,650,608 | 3/1972 | Baker | 350/117 X |
| 3,674,338 | 7/1972 | Cartmell et al. | 350/117 |
| 3,724,349 | 4/1973 | Von Belvard et al. | 354/43 X |
| 3,836,931 | 9/1974 | Plummer | 354/201 X |
| 3,838,909 | 10/1974 | Fitzgibbons | 350/286 X |
| 3,961,348 | 6/1976 | Miyazaki | 354/289 |
| 3,986,022 | 10/1976 | Hyatt | 354/227 X |
| 4,029,393 | 6/1977 | Dungan et al. | 350/160 LC |
| 4,030,109 | 6/1977 | Hecker et al. | 350/160 LC X |

FOREIGN PATENT DOCUMENTS

| | | | |
|---|---|---|---|
| 562523 | 7/1944 | United Kingdom | 350/122 |
| 1002033 | 8/1965 | United Kingdom | 354/200 |

*Primary Examiner*—John Gonzales
*Attorney, Agent, or Firm*—Stonebraker, Shepard & Stephens

[57] ABSTRACT

A focusing screen of a viewfinder system for a photographic camera is designed as a liquid crystal cell having two transparent bodies which lie opposite one another with plane surfaces at a short distance from each other, these plane surfaces carrying electrodes. By applying a current to the electrodes, or by cutting off such current, the character of the focusing screen is changed, providing a single multi-purpose screen and obviating the need to change the screen when focusing for a different type of photography. The liquid crystal screen may be used in conjunction with or may be formed as part of a field lens or a Fresnel lens forming part of the viewfinder system. Various arrangements of the electrodes for changing the character of the screen over only part of the area thereof, rather than the entire area thereof, are disclosed.

1 Claim, 8 Drawing Figures

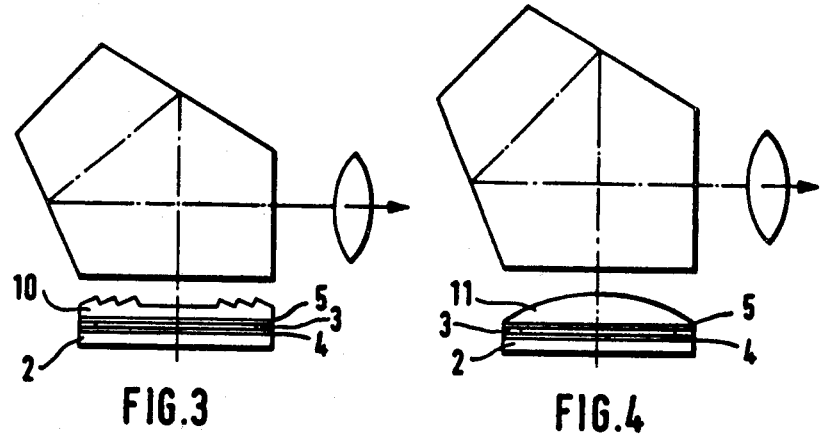
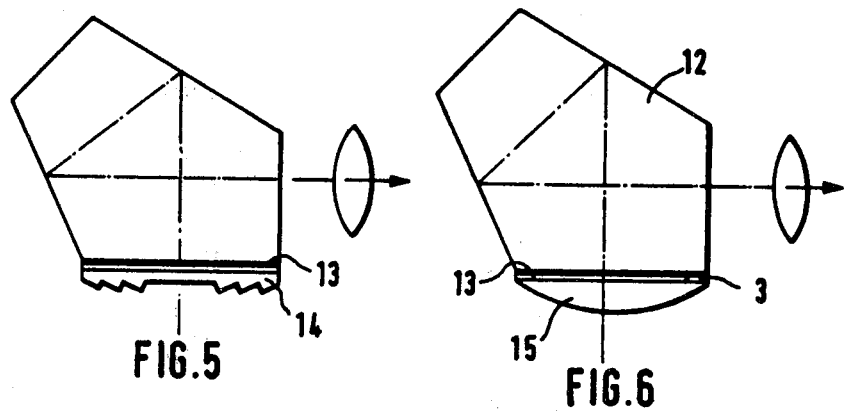

VIEWFINDER SYSTEM WITH FOCUSING SCREEN

CROSS REFERENCE TO RELATED APPLICATION

This application is a continuation of application Ser. No. 736,705, filed Oct. 29, 1976, now abandoned.

BACKGROUND OF THE INVENTION

The invention relates to a viewfinder system for photographic cameras, and more particularly to a focusing screen forming part of the viewfinder system. The present invention is useful particularly but not exclusively in the viewfinder system of a mirror reflex camera.

In such a camera, a focusing or viewfinder screen is arranged in a plane which is conjugate to the image plane, allowing the image formed on the focusing screen to be focused exactly and without any interference. A number of widely varying focusing screens for this purpose are known in the art, such as clear glass screens, ground glass screens, micro-screens, and screens with split field centers. Various types of screens are used for various applications. For example, one type of screen may be preferred for microscope photography, another type for astro photographs, perhaps another type for macroshots, another for photographs in poor light conditions, or photographs in conjuction with long focus lenses. To insure the versatility of a camera, the focusing screen of the viewfinder system is frequently designed to be interchangeable, so that it may be removed from the camera and replaced by another screen of different character, when a different type of photography is to be performed.

The making of the camera in a way to permit easy interchangeability of the focusing screen entails not only constructional problems in many cases, but also an increased cost. Hence exchangeable focusing screens are usually found only in cameras of relatively high price. In addition to this, the exchanging of screens is usually a fairly complicated and time-consuming operation, which entails the additional disadvantage of having to store and carry the desired interchangeable screens.

An important object of the present invention, therefore, is to design a viewfinder system, including the focusing screen, in such a way that it may be used in a plurality of different modes without changing the screen, thus enabling the photographer to have the advantages of two or more different types or kinds of screen for selective use, without actually changing the screen in the camera. The photographer may thus adapt his focusing screen, within certain limits, to the respective photographic conditions and purposes of the moment, with no need to exchange the focusing screen.

SUMMARY OF THE INVENTION

According to the invention, the object above stated is realized by designing the screen as a liquid crystal cell comprising two transparent bodies which lie opposite one another with plane surfaces at a short distance, and whose plane surfaces carry electrodes. By applying a voltage to the electrodes, the character of the liquid crystal cell is changed, thereby producing a focusing screen of a different character from the character which it has when there is no voltage applied to the electrodes.

According to a further development of the invention, the electrodes are formed by electrically conductive layers applied to the plane surfaces of the liquid cell. If both conductive layers are of transparent material, then the screen may be used as a so-called direct-vision screen in the transmitted light finder of a viewfinder system. According to a modified design of the invention, one of the two conductive layers may be transparent and the other may be reflective. It is then possible to use the focusing screen as a reflector screen in the reflected light finder of another viewfinder system.

Such liquid crystal cells have the property that when voltage is applied, a condition of turbidity or cloudiness will appear in the liquid crystal, thus causing a diffused scattering of light. In the clear condition of the crystal (when no voltage or current is applied) the focusing screen is particularly well suited for viewing the image in poor light conditions, and for microscopic photography. When the electric potential is applied and the crystal becomes turbid or cloudy, it forms the equivalent of a ground glass screen, especially useful for the exact focusing of the image in the image plane. In this manner, two different kinds of focusing screens are available in a camera, without any need to change screens.

According to a further development of the invention, further variants of focusing screens are provided by interrupting the electrically conductive layer along at least one circular ring extending coaxially with respect to the center of the focusing screen, and by providing separate current supply circuits for each separate part of the electrically conductive layer. By applying voltage to one or the other of the parts of the conductive layers, it is possible to obtain a selective local turbidity of the crystalline liquid beneath this particular layer. For example, the central portion of the focusing screen can be made turbid to produce a ground glass effect, while the remainder of the screen, around this central part, remains clearly transparent. This provides and extremely bright focusing screen which allows a satisfactory image viewing in poor light conditions and an exact focusing by means of the "frosted" central part of the screen having the ground glass effect.

To provide a viewfinder system comprising a split field or micro-screen or micro-slit center, a circular recess may be provided in the area of this center on the plane surface of one transparent body.

If the electrically conductive layer of one transparent body is also interrupted along a circular ring, as stated above, then it is possible to provide in this manner a focusing screen with a split image or micro-screen center, comprising a frosted screen ring coaxially surrounding this center, and comprising a remaining surface of the focusing screen which may be either clear or frosted, depending on the photographer's choice, by applying a suitable voltage to the various current supply lines connected to the individual electrically conductive partial layers. Thus one obtains a single focusing screen fulfilling all the requirements which could hitherto be achieved only by interchanging various different focusing screens available on the market.

BRIEF DESCRIPTION OF THE DRAWINGS

FIGS. 3–6 are diagrammatic representations of viewfinder systems with different variants of the construction of the focusing screen basically illustrated in FIGS. 1 and 2;

DESCRIPTION OF THE PREFERRED EMBODIMENTS

Figure 1:
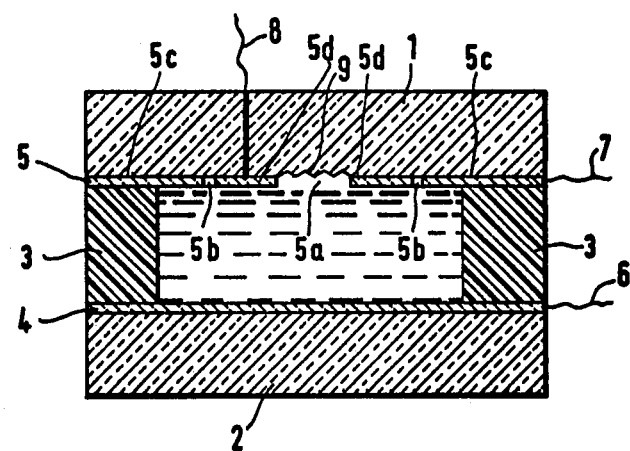
FIG. 1 is a diagrammatic or schematic representation, on a greatly enlarged scale, of a direct vision focusing screen according to one embodiment of the invention.

The focusing screen illustrated in FIG. 1, which is designed as a clear vision screen, consists of two plane transparent plates 1 and 2 which may be made of glass or of transparent plastic material. The two plates are superimposed at a spacing between them of approximately 10μ, which spacing is insured by the insertion of a film 3 acting as a spacer. These parts are cemented or sealed to each other with glass solder on the edges. The space left between the plates is filled with a nematic liquid crystal, whose dielectric anisotropy is selected to be, for example, $\Delta\epsilon < 0$ and whose conductivity is between $10^{-9}$ and $10^{-12}$ $\Omega^{-1}cm^{-1}$. The two adjacent surfaces of the two plates 1 and 2, that is, the inner surfaces of these plates, which face each other, are provided with electrically conductive transparent layers 4 and 5. Current supply lines or conductors 6 and 7 allow a voltage to be applied to these two conductive layers.

The layer 5 on the inner surface of the plate 1 has at its center a circular recess 5a. In the area of this recess, the plate 1 is provided with a micro-screen or microslit spot 9. Coaxially around this spot, the electrically conductive layer 5 of the plate 1 is interrupted along a circular ring 5b. By this means there are formed, on the under face of the plate 1, two partial layers 5c outside the dividing ring 5b and 5d inside the dividing ring 5b, which two portions 5c and 5d are electrically separated from each other, and are respectively connected to separate current supply lines 7 and 8, respectively.

Figure 2:
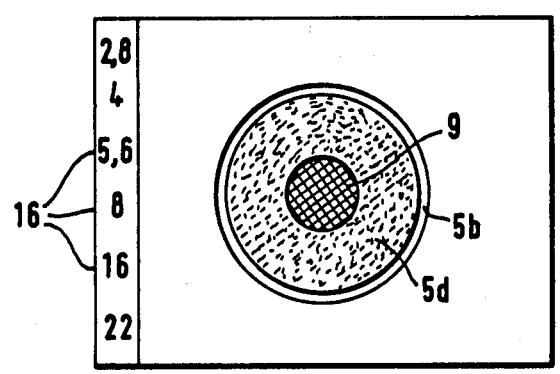
FIG. 2 is a top plan view thereof.

When a voltage is applied to the current supply lines 6 and 8, then a local turbidity or cloudiness occurs in the crystalline liquid in the area of the partial layer 5d, as illustrated schematically in FIG. 2. As a result, the otherwise clear and transparent focusing screen now shows a frosted ring around the micro-screen central portion 9. In this manner, there is obtained a focusing screen which is particularly well suited for photographs in poor light conditions. The clear transparent surface of the focusing screen allows the poorly illuminated object to be observed accurately, while exact focusing is possible in this area with the aid of the frosted circular ring, giving a ground glass effect. Of course it is possible to omit the micro-screen central portion 9, and provide the electrically conductive material throughout the entire area within the dividing line 5b, thus providing a focusing screen which will have an altogether frosted central portion, surrounded by a transparent portion.

If it is desired to have a completely clear screen, offering special advantages for microscopic photography, then no voltage is applied to any part of the crystal cell. When the voltage is cut off, the nematic liquid becomes clear and transparent again, and the entire area of the screen operates as a clear-vision screen.

Figure 7:
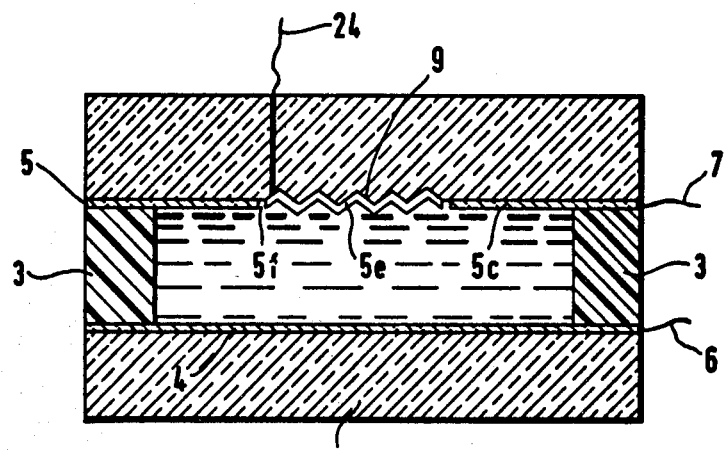
FIG. 7 is a view similar to FIG. 1 illustrating another embodiment of the invention.

In contrast to the construction illustrated in FIG. 1, the embodiment illustrated in FIG. 7 is not provided with a recess or omission of the conductive layer in the area of the micro-screen center 9. On the contrary, there is an electrically conductive layer 5e on this micro-screen portion 9, having its own separate current supply line 24. This electrically conductive layer 5e is separated along the circular line 5f from the electrically conductive layer 5c on the remainder of the surface of the plate 1, surrounding the central micro-screen portion 9, and this surrounding electrically conductive layer 5c has its current supply line 7.

By applying a voltage to the supply lines 6 and 24, the area of the micro-screen center 9 is rendered diffusely scattering, so that the micro-screen will disappear for the observer and will be replaced by a frosted circle at the center of the screen. A focusing screen designed in this way is particularly suitable for focusing in cameras having a working diaphragm with the minimum aperture set. Here, the image on the focusing screen is darkened (when the diaphragm is set at a small aperture) to such an extent that a micro-screen is no longer suitable for focusing. However, this arrangement just described enables the micro-screen to be replaced, in effect, by a ground glass or frosted center, thus enabling good focusing. Of course in this arrangement (where there is a conductive layer on the central micro-screen portion) it is possible also to provide a further interruption of the conductive layer 5 along further concentric circular rings just as in the case of FIG. 1, each individual partial layer being provided with a separate current supply line.

In order to form an image of the lens exit pupil in the eye of the observer, field lenses or Fresnel lenses are usually installed in the viewfinder system. The field lenses, which are conventionally made of either glass or plastic material, or the Fresnel lenses, which are conventionally made of plastic material, may be used advantageously for construction of the liquid crystal cell according to the present invention. For this purpose, one plate of the liquid crystal cell is replaced by a Fresnel lens 10, as shown schematically in FIG. 3, or by field lens 11, as shown schematically in FIG. 4. The plane surface of the field lens or Fresnel lens thus forms one inner face of the liquid cell, and is provided with the electrically conductive layer 5, this surface of the lens and the formation of the electrically conductive layer being according to any of the forms described in connection with FIGS. 1 and 7. In other words, the conductive layer may be continuous or interrupted, and there may be a micro-screen portion at the center of the area, according to any of the forms described in connection with FIGS. 1 and 7. The remainder of the construction is identical with that described in connection with FIGS. 1 and 7. In effect, this aspect of the invention may be regarded as the use of a field lens or a Fresnel lens formation on the upper surface of the plate 1 of the cell illustrated in FIGS. 1 and 7.

In a mirror reflex camera in which a pentagonal prism 12 (FIG. 6) is used above the focusing screen, the overall height of the viewfinder system can be kept low if the lower surface of the pentagonal prism is used as one of the surfaces of the liquid crystal cell. To this end, the pentagonal prism surface is used as the upper surface of the liquid cell, and is provided with the electrically conductive layer 13, which may be uniform or which may have clearances or recesses or interruptions, just as the case of the conductive layer and associated parts described in connection with FIGS. 1 and 7. Moreover, the lower plate of the liquid cell (corresponding to the plate 2 in FIGS. 1 and 7) may be formed by a Fresnel lens 14 (FIG. 5) or a field lens 15 (FIG. 6) with its plane surface uppermost and provided with a conductive coating or layer corresponding to the conductive layer 4 in FIGS. 1 and 7.

Figure 8:
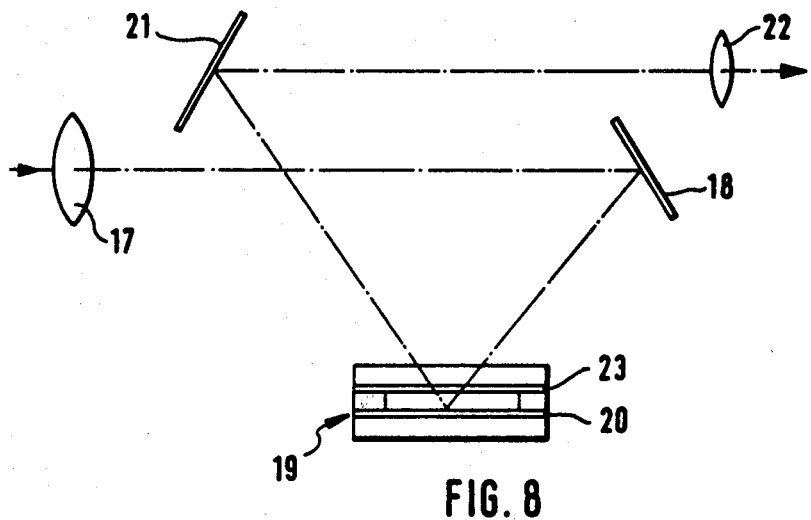
FIG. 8 is a diagrammatic representation of a viewfinder system comprising a focusing screen designed as a reflector screen.

In FIG. 8 there is diagrammatically shown a viewfinder system in which the focusing screen, according to the invention, is used as a reflector screen. The light from the object, coming through the lens 17, is reflected on the first mirror 18, passes to the focusing screen indicated in general at 19, is reflected on the electrically conductive layer 20 which is designed as a reflecting surface, to a second mirror 21, and emerges from here through the viewfinder eyepiece 22.

The design of this focusing screen 19 is identical with that of the focusing screen shown in FIG. 1 or FIG. 7, except for the difference that one of its electrical conductive layers 20, corresponding to the layer 4 in FIGS. 1 and 7, is made reflective, while the other electrically conductive layer 23 remains transparent in the usual way. This layer 23 may, like the layer 5 in FIGS. 1 and 7, be split into partial layers covering certain areas, or may be continuous, and a micro-screen or split-image center may be used in connection with this layer 23, just as in the case of FIGS. 1 and 7.

Also, one or the other of the transparent bodies in this screen 19 may be designed as a field lens or a Fresnel lens.

The construction of the focusing screen as a liquid crystal cell enables the provision in a very simple manner of an indicating means for indicating the exposure parameters or camera functions in the viewfinder. For this purpose, the electrically conductive layer of one of the plates is removed at one edge of the focusing screen and is replaced by electrically conductive portions in the shape of numerals, symbols, or other designations which indicates some of the exposure factors or other parameters of the camera functions. This is shown at 16 in FIG. 2, and as an example is here illustrated as a series of numerals indicating the relative diaphragm aperture. Each of these separate aperture numbers or other symbols is provided with its own separate electrical conductor, and means is provided for applying a voltage to the particular separate electrode 16 in accordance with the desired camera function which is to be indicated. For example, when the diaphragm adjustment is set for an aperture of "8" the conductor leading to the electrode in the shape of the numeral "8" in the scale 16 in FIG. 2 would be supplied with current from the battery or other source of voltage. In this manner, the crystalline liquid is rendered turbid or cloudy in the area of the particular numeral or symbol (in the group 16) to which the voltage is supplied, while the crystalline liquid in the area of the other electrode 16 remains clear and transparent. Thus when one looks at the focusing screen, one would see at the edge of the screen a frosted numeral or symbol indicating the diaphragm aperture to which the camera was set, or indicating any other camera function or factor which the electrodes 16 are designed to show.

What is claimed is:

1. The method of providing a photographic camera with a focusing screen having different concentrically arranged areas of the screen each capable of serving selectively either as a ground-glass type screen area or as a clear screen area, independently of the selection made for a different area of the same screen during the same focusing operation, said method comprising the steps of providing two transparent bodies with surfaces lying opposite to and slightly spaced from each other and with electrodes facing each other on said surfaces, the electrodes on one of said surfaces being divided on a concentrically arranged area pattern, providing in the space between such surfaces liquid crystal material of a character such that when a sufficient electric potential is applied to electrodes facing each other the liquid crystal material between such facing electrodes will become turbid and such material will be clear and non-turbid in the space between facing electrodes to which said potential is not applied, applying said electric potential to an electrode on one of said surfaces having an area covering only part of the area of such surface and to a facing electrode covering the entire area of the opposite surface so that said material between such electrodes will become turbid and said part of the area will act similarly to a ground-glass focusing screen, while omitting the application of said potential to an electrode on a different area of such surface so that the material opposite said electrode on the different area will be clear and non-turbid and that the different area will act as a clear focusing screen while the earlier mentioned area to which electric potential is applied is acting as a ground-glass focusing screen.

* * * * *